United States Patent [19]
Jang

[11] Patent Number: 5,470,365
[45] Date of Patent: Nov. 28, 1995

[54] SMOKE EXHAUSTER

[76] Inventor: Sun-Sing Jang, 650, Yuan-Huan E. Rd., Fong-Yuan,, Taichung Hsien, Taiwan

[21] Appl. No.: 366,307

[22] Filed: Dec. 29, 1994

[51] Int. Cl.$^6$ .................................................. B01D 35/02
[52] U.S. Cl. ........................ 55/510; 55/DIG. 36; 55/518
[58] Field of Search ...................... 55/510, 518, DIG. 36

[56] References Cited

U.S. PATENT DOCUMENTS

| | | | |
|---|---|---|---|
| 3,125,869 | 3/1964 | Winton | 62/317 |
| 3,572,014 | 3/1971 | Hansen | 55/316 |
| 4,322,230 | 3/1982 | Schoen et al. | 55/316 |
| 5,196,040 | 3/1993 | Malloy et al. | 55/323 |
| 5,268,012 | 12/1993 | Jang | 55/471 |

*Primary Examiner*—Tim R. Miles
*Attorney, Agent, or Firm*—Bowdy and Neimark

[57] ABSTRACT

A smoke exhauster comprises a filtration member of a rectangular framelike construction. The filtration member is disposed in the smoke exhauster such that the periphery of the filtration member urges the inner wall of a stopping portion of the base board of the smoke exhauster, and that the top and the bottom of the filtration member are attached respectively to the bottom of the bottom board of the smoke exhauster and the top of a main plate portion of the base board of the smoke exhauster. The filtration member serves to purify the fume so as to reduce the discharge of the air pollutant into the atmosphere.

8 Claims, 5 Drawing Sheets

SMOKE EXHAUSTER

BACKGROUND OF THE INVENTION

The conventional smoke exhauster is provided over the housing thereof with a smoke discharging tube to facilitate the exhausting of smoke and oil vapor which are drawn by the motor and the impeller. Such a conventional smoke exhauster is defective in design in that the fume so exhausted can pollute the environment.

SUMMARY OF THE INVENTION

It is therefore the primary objective of the present invention to provide a smoke exhauster capable of filtering the fume so that the fume so exhausted does not pollute the air of our environment.

The foregoing objective of the present invention is attained by a smoke exhauster comprising a filtration member of a rectangular construction. The filtration member has a periphery urging the inner wall of the stopping portion of the base board of the smoke exhauster. The top and the bottom of the filtration member are attached respectively to the bottom of the bottom board of the smoke exhauster and the top surface of the main board portion of the smoke exhauster.

The foregoing objective, features and advantages of the present invention will be more readily understood upon a thoughtful deliberation of the following detailed description of the present invention in conjunction with the accompanying drawings.

DETAILED DESCRIPTION OF THE EMBODIMENTS

Figure 1:
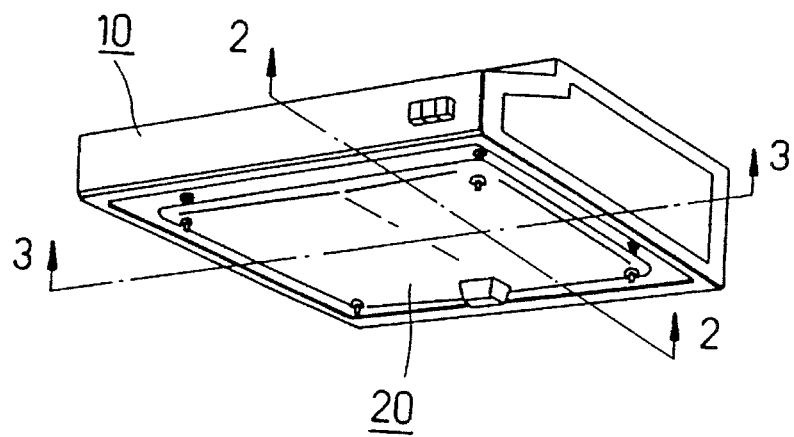
FIG. 1 shows a perspective view of the present invention.
Figure 2:
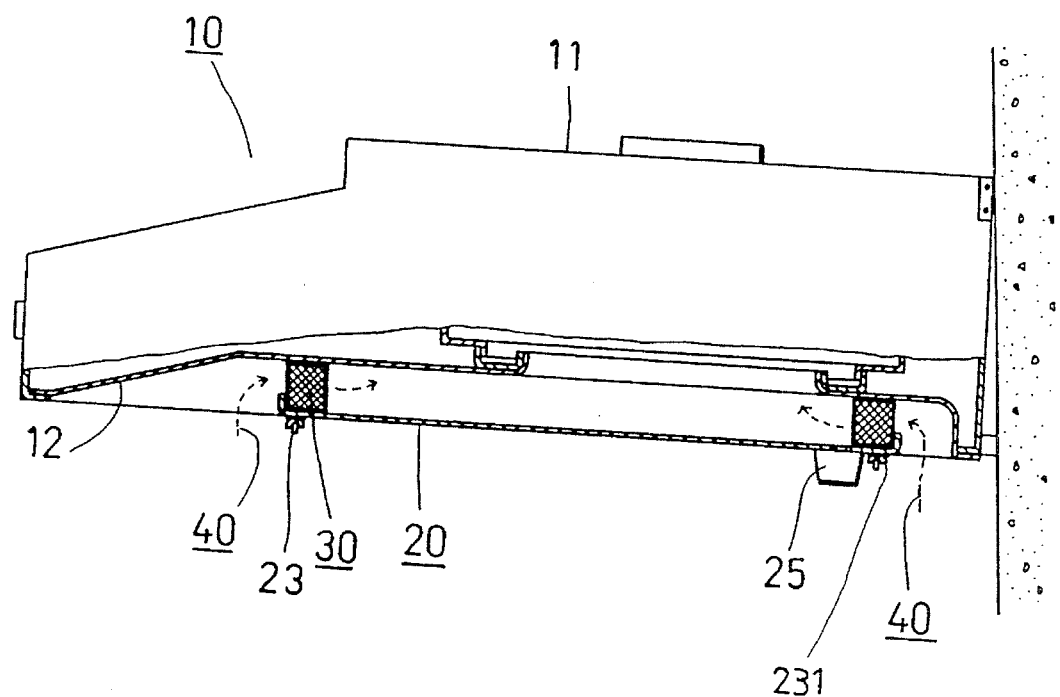
FIG. 2 shows a sectional view of a portion taken along the line 2—2 as shown in FIG. 1.
Figure 3:
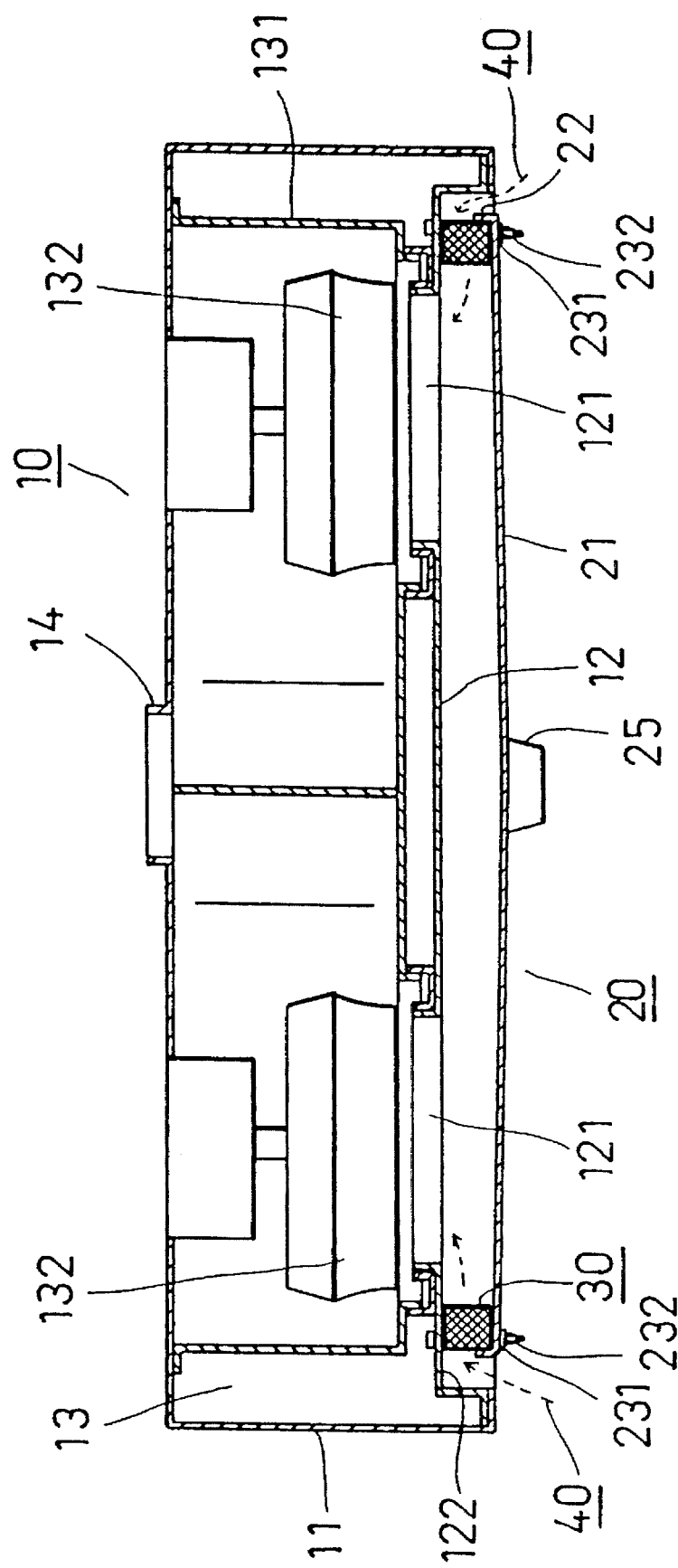
FIG. 3 shows a sectional view of a portion taken along the line 3—3 as shown in FIG. 1.
Figure 4:
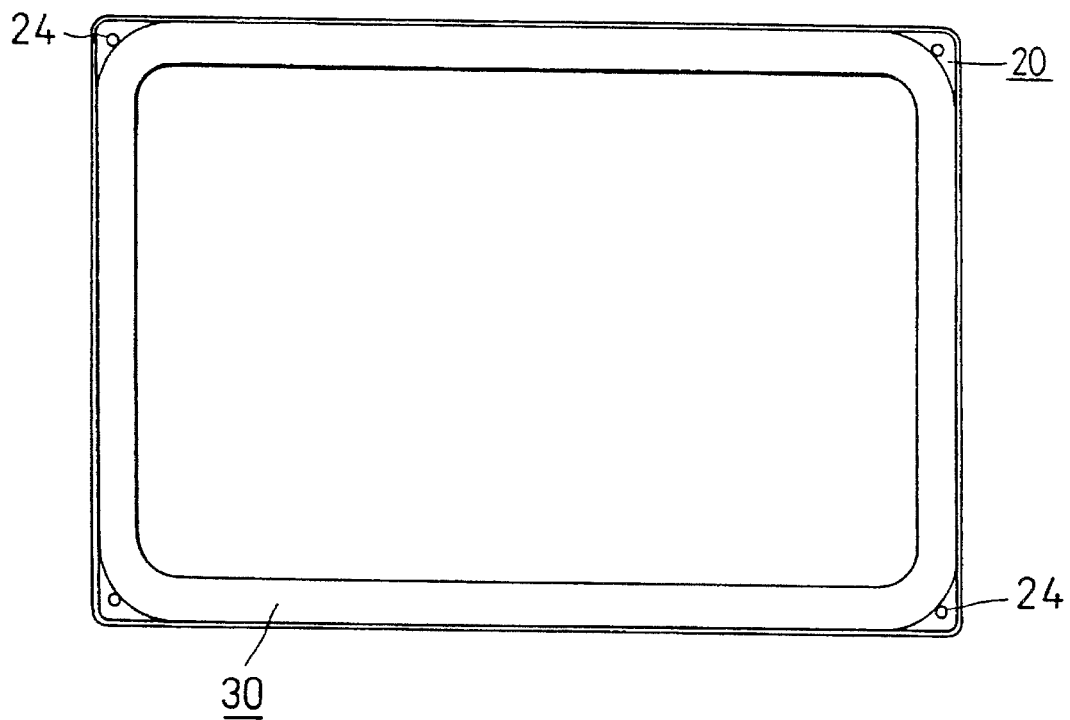
FIG. 4 shows a plan view illustrating the position relationship between the filtration member and the base board of the present invention.

As shown in FIGS. 1–4, a smoke exhauster of the first preferred embodiment of the present invention comprises the component parts which are described explicitly hereinafter.

A housing 10 is made up of an upper casing 11 and a bottom board 12. The upper casing 11 is provided therein with a fume drawing device 13 which is composed of a bellows 131 and an impeller 132. The bottom board 12 is provided with a fume admitting port 121.

A base board 20 of a rectangular shape is provided with a main board portion 21 which is smaller in size than the flat board portion 122 of the bottom board 12 and is provided peripherally with a stopping portion 22 of an appropriate height. The four corners of the base board 20 are provided respectively with a hole 24 extending from the left and the right outer edges of the main board portion 21 toward the front and the rear center lines in an opposite and slightly slanted manner. The base board 20 can be detachably fastened under the bottom board 12 by means of four fastening members 23. An oil depositing member 25 is disposed at the rear side of the main board portion 21.

A filtration member 30 of a rectangular frame body has a periphery urging the inner side wall of the stopping portion 22 of the base board 20. The top and the bottom of the filtration member 30 are attached respectively with the bottom of the bottom board 12 and the top of the main board portion 21.

As the smoke exhauster is started, the impeller 132 is actuated to draw the cooking fume to move in the direction indicated by an arrow 40 to pass through the filtration member 30. The filtered fume is then allowed to flow into the fume drawing device 13 via the fume admitting port 121 before being exhausted via the fume discharging port 14 located at the top of the upper casing 11. The used and dirty filtration member 30 can be removed for replacement by loosening a leakproof ring 231 and a nut 232 of the fastening member 23 so as to facilitate the removal of the base board 20. The dirty filtration member 30 may be washed or replaced.

Figure 5:
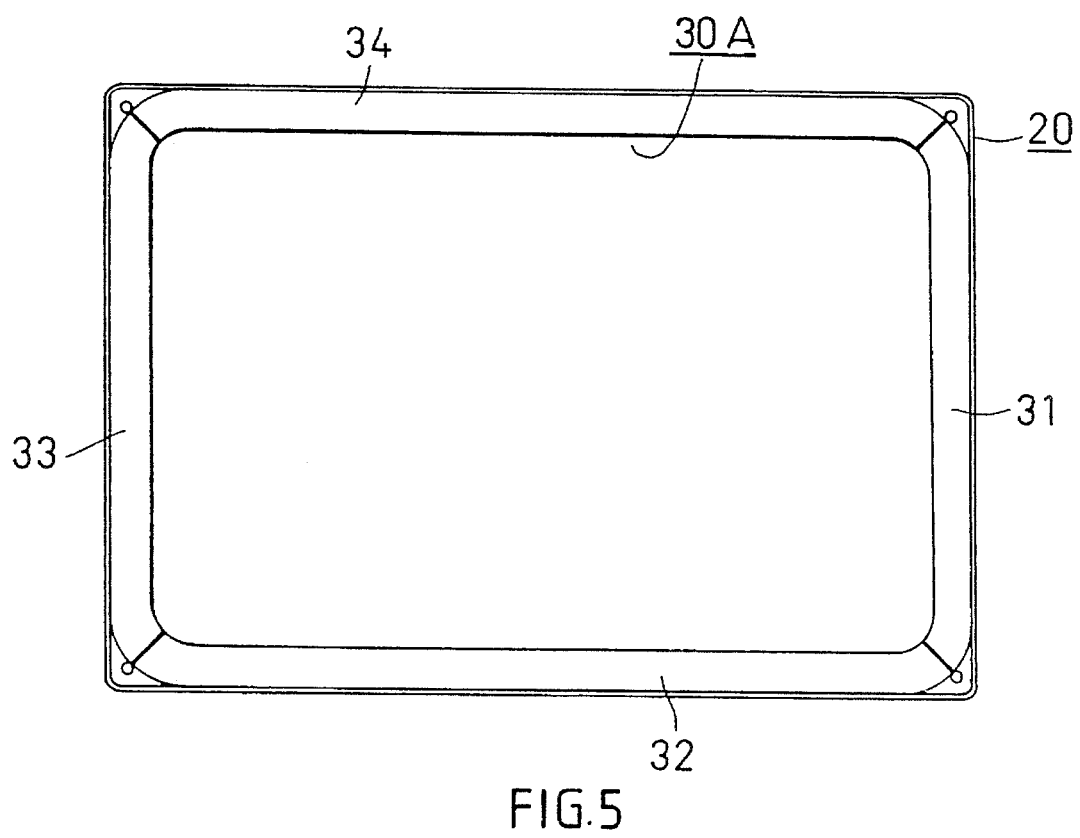
FIG. 5 shows the filtration member of a second preferred embodiment of the present invention.

As shown in FIG. 5, the filtration member 30A of the second preferred embodiment of the present invention is different from the filtration member 30 of the first preferred embodiment in that the former is composed of four long striplike filtration elements 31, 32, 33 and 34.

Figure 6:
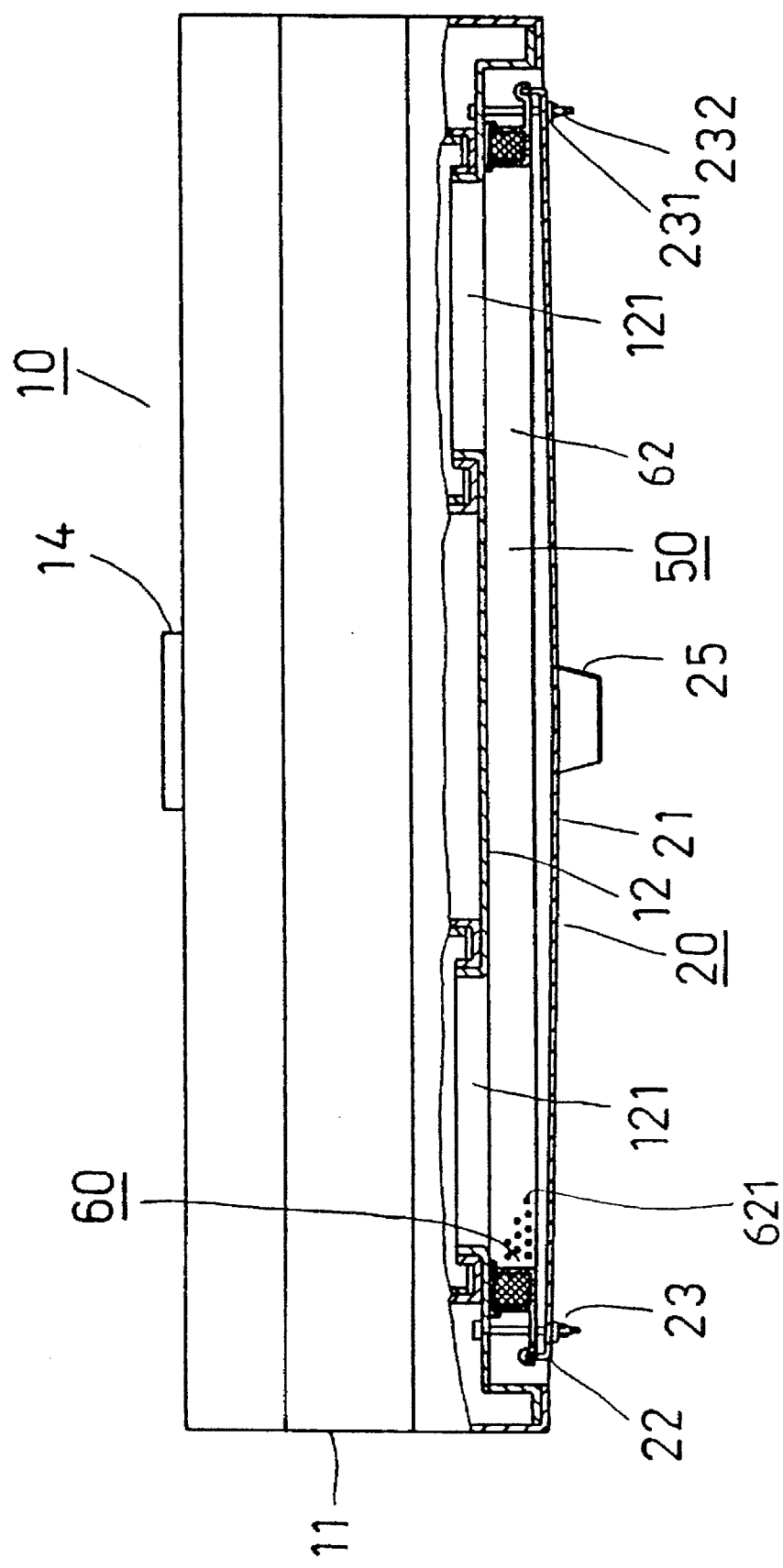
FIG. 6 shows the filtration member of a third preferred embodiment of the present invention.
Figure 7:
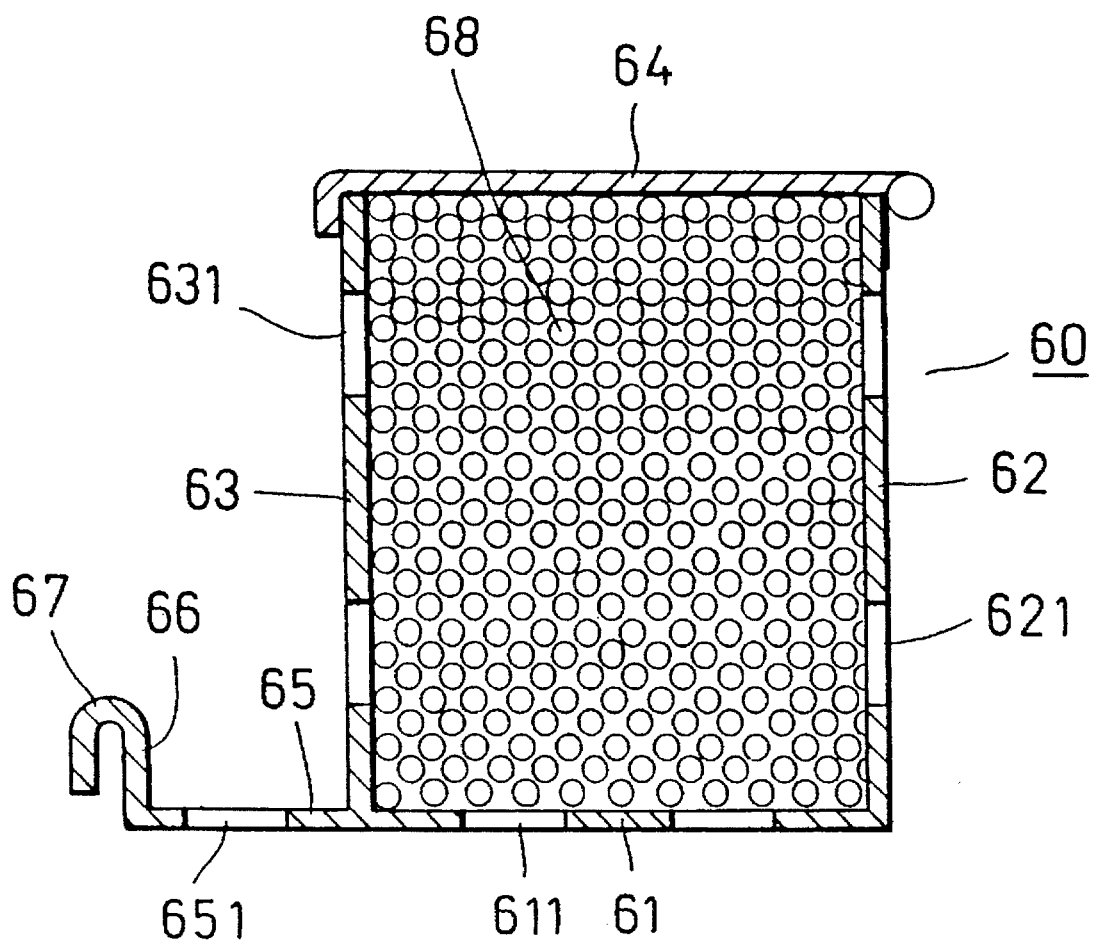
FIG. 7 shows an enlarged sectional view of the filtration member as shown in FIG. 6.

As shown in FIGS. 6 and 7, the filtration member 50 of the third preferred embodiment of the present invention is composed of four long striplike filtration elements 60 which form a rectangular frame. Each of the four filtration elements 60 is made of a fireproof and heat-resistant material and is provided with a bottom plate portion 61 which is in turn provided therein with an inner wall plate portion 62 extending upwards and an outer wall plate portion 63 extending upwards. The filtration elements 60 are further provided respectively and pivotally at the top thereof with an upper cover 64. In addition, each filtration element 60 is provided respectively at both ends of the longitudinal axis thereof with an end plate (not shown in the drawing) for forming therein a receiving space in which a filtration material 68, such as active carbon, is disposed. The bottom plate portion 61 is provided on the outer edge thereof with a short plate portion 65 extending outwards and having on the outer edge thereof an upright plate portion 66 extending upwards. The upright plate portion 66 is provided on the top thereof with a locating portion 67. Futhermore, the bottom plate portion 61 and the short plate portion 65 are provided respectively with a plurality of oil dripping holes 611, 651. The inner wall plate portion 62 and the outer wall plate portion 63 are provided respectively with a plurality of through holes 621,631. In combination, the locating portion 67 is joined with the stopping portion 22 surrounding the base board 20. The bottom plate portion 61 and the top of the main board portion 21 of the base board remain apart by a predetermined distance. The upper cover 64 is attached to the bottom of the bottom board 12. In operation, the cooking fume is allowed to flow through the filtration material 68 via the through holes 631 of the outer wall plate portion 63 and is then let out via the through holes 621 of the inner wall plate portion 62. The fume is then guided to the bellows 131 via the fume admitting port 121 of the bottom board 12. As the filtration material 68 gets dirty, it can be replaced by opening the upper cover 64.

The filtration element 60 of the third preferred embodiment of the present invention may be provided therein with a deodorant in addition to the filtration material 68.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of interpretation so as to encompass all such modifications and equivalent structures.

What is claimed is:

1. A smoke exhauster having a housing provided with a bottom board under which a base board is detachably fastened, said base board being greater in area than a fume admitting hole of said bottom board, said base board having a main plate portion provided peripherally with a stopping portion extending upwards for locating a filtration member of a rectangular framelike construction such that the periphery of said filtration member urges an inner side wall of said stopping portion of said base board, and that a top and a bottom of said filtration member are attached respectively to a bottom of said bottom board and a top of said base board.

2. A smoke exhauster according to claim 1 wherein said filtration member is composed of four long striplike filtration elements.

3. A smoke exhauster according to claim 1 wherein said main plate portion of said base board has a left outer edge and a right outer edge, which are extended inwards and slanted oppositely toward a center line of said base board so as to conjugate.

4. A smoke exhauster according to claim 3 wherein said filtration member is composed of four long striplike filtration elements.

5. A smoke exhauster according to claim 3 wherein said filtration member is made up of four long striplike filtration elements, each of which has a bottom plate portion provided therein with an inner wall plate portion extending upwards and with an outer wall plate portion extending upwards, each of said filtration elements further having a top provided with an upper cover pivoted thereto and fastened to a bottom of said bottom board, each of said filtration elements still further having respectively at both ends of a longitudinal axis thereof an end plate for forming therein a receiving space dimensioned to receive therein a filtration material, said bottom plate portion provided with a short plate portion extending outwards from an outer edge thereof, said short plate portion provided with an upright plate portion extending upwards from an outer edge thereof, said upright plate portion having a top provided with a locating portion for locating said upright plate portion on said stopping portion of said base board, said bottom plate portion and said short plate portion provided respectively with a plurality of oil dripping holes, said inner wall plate portion and said outer wall plate portion provided respectively with a plurality of through holes.

6. A smoke exhauster according to claim 1 wherein said filtration member is made up of four long striplike filtration elements, each of which has a bottom plate portion provided therein with an inner wall plate portion extending upwards and with an outer wall plate portion extending upwards, each of said filtration elements further having a top provided with an upper cover pivoted thereto and fastened to a bottom of said bottom board, each of said filtration elements still further having respectively at both ends of a longitudinal axis thereof an end plate for forming therein a receiving space dimensioned to receive therein a filtration material, said bottom plate portion provided with a short plate portion extending outwards from an outer edge thereof, said short plate portion provided with an upright plate portion extending upwards from an outer edge thereof, said upright plate portion having a top provided with a locating portion for locating said upright plate portion on said stopping portion of said base board, said bottom plate portion and said short plate portion provided respectively with a plurality of oil dripping holes, said inner wall plate portion and said outer wall plate portion provided respectively with a plurality of through holes.

7. A smoke exhauster according to claim 6 wherein said filtration material of said filtration elements is an active carbon.

8. A smoke exhauster according to claim 7 wherein said filtration elements are provided therein respectively with a deodorant.

* * * * *